United States Patent [19]

Franz

[11] 3,770,412
[45] Nov. 6, 1973

[54] HERBICIDAL METHOD EMPLOYING ARYLTHIOHYDRAMIC ACIDS

[76] Inventor: John E. Franz, Crestwood, Mo.

[22] Filed: Dec. 2, 1971

[21] Appl. No.: 204,306

[52] U.S. Cl. .............................. 71/98, 260/500.5 H
[51] Int. Cl. .............................................. A01n 9/12
[58] Field of Search .............................. 71/98, 118; 260/453 R, 500.5 H

[56] References Cited

UNITED STATES PATENTS

| | | | |
|---|---|---|---|
| 3,236,871 | 2/1966 | Hinman et al. | 260/500.5 H |
| 3,123,460 | 3/1964 | Schafer et al. | 71/98 |
| 2,936,323 | 5/1960 | Eden | 71/118 |
| 2,412,510 | 12/1946 | Jones | 71/98 |
| 2,577,969 | 12/1951 | Jones | 71/118 |
| 3,268,539 | 8/1966 | Levy | 260/453 R |

FOREIGN PATENTS OR APPLICATIONS 21,500  3/1966  Japan .................................... 71/98

OTHER PUBLICATIONS

Bacchetti et al., "Thiohydroxamic Acids, etc.," (1958) CA 52 p. 18299 (1958).
Hase et al., "Inhibition of P. Vulgaris Veease etc.;" (1967) CA 67 No. 105516; (1967).

*Primary Examiner*—Glennon H. Hollrah
*Attorney*—Neal E. Willis et al.

[57] ABSTRACT

Herbicidal compositions containing as the herbicidally active ingredient an aromatic thiohydroxamic acid and herbicidal methods employing such compositions are disclosed. Benzothiohydroxamic acids are useful in controlling undesirable vegetation.

4 Claims, No Drawings

HERBICIDAL METHOD EMPLOYING ARYLTHIOHYDRAMIC ACIDS

This invention is related to new herbicidal compositions and to new herbicidal methods. More particularly this invention relates to methods of controlling growing vegetation by applying thereto a herbicidally effective amount of an aromatic thiohydroxamic acid.

In accordance with this invention, it has been found that the growth of emerging seedlings and established vegetation can be controlled and modified by exposing the emerging seedlings or above-ground portions of established vegetation to the action of a herbicidally effective amount of one or more aromatic thiohydroxamic acid of the formula

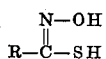

wherein R is an aryl group of from six to 10 carbon atoms or said aryl group substituted with a lower alkyl, a halogen or nitro group.

Illustrative of the aryl groups represented by R are for example phenyl and naphthyl. Illustrative of the lower alkyl substituted aryl groups represented by R are, for example, tolyl, xylyl, ethylphenyl, butylphenyl, diethylphenyl, trimethylphenyl and the like. The term "halo" as employed herein means chlorine, fluorine, bromine or iodine. The substituted aryl groups represented by R can contain from 1 to 3 of the above substituents and said substituents need not be the same.

The herbicidal compositions of this invention contain at least one active ingredient and a material referred to in the art as a herbicidal adjuvant in liquid or solid form. The herbicidal compositions are prepared by admixing the active ingredient with an adjuvant including diluents, extenders, carriers and conditioning agents to provide compositions in the form of finely-divided particulate solids, granules, pellets, solutions and aqueous dispersions or emulsions.

Typical finely-divided solid carriers and extenders which can be used in the herbicidal compositions of this invention include but are not limited to talcs; clays, pumice, silica, diatomaceous earth, quartz, Fuller's earth, powdered cord, powdered wood, walnut flour; chalk, tobacco dust, volcanic ash and the like. Typical liquid diluents include but is not limited to kerosene, Stoddard solvent, hexane, benzene, toluene, acetone, ethylene dichloride, xylene, alcohols, diesel oil, glycols and the like.

The herbicidal compositions of this invention, particularly liquids and wettable particles, usually contain as a conditioning agent one or more surface-active agents in amounts sufficient to render a given composition readily dispersible in water or oil. By the term "surface-active agent" it is understood that wetting agents, dispersing agents, suspending agents and emulsifying agents are included therein.

The term "herbicidal compositions" as used herein and in the appended claims is intended to mean not only compositions in a suitable form for applications but also concentrated compositions which require dilution or extension with a suitable quantity of liquid or solid adjuvant prior to application.

By the term "active ingredient" as employed herein is meant the aromatic hydroxamic acid.

The aromatic thiohydroxamic acids which are employed in the herbicidal methods and compositions of this invention are produced in accordance with the following general procedure which for the sake of simplicity gives the preparation of benzothiohydroxamic acid:

A solution of benzohydroxamoyl chloride (6.3 g. 0.04 mole) dissolved in ethanol (120 mls) was added slowly with stirring to a solution of sodium hydrosulfide NaSH (11 grams) dissolved in water (200 ml). The temperature of the mixture rose due to the exothermic heat of reaction during which time an oily phase developed. After approximately ¼ hour the mixture was extracted with ether, and the ethereal solution discarded. The aqueous phase was acidified to a pH of 1 with hydrochloric acid while purging the solution with nitrogen to sweep out the liberated hydrogen sulfide. The precipitated oil was extracted with diethyl ether and the organic solution washed with water. After drying over anhydrous sodium sulfate, the solution was decanted, the solvent removed at reduced pressure and was then extracted with petroleum ether to yield benzothiohydroxamic acid

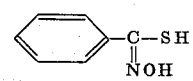

as a yellow oil.

If the product is a solid it is washed with petroleum ether and recrystallized from hexane or a hexane-ether mixture.

By following the above general procedure and employing the appropriate aromatic hydroxyamoyl chloride, the following compounds can be prepared:

3,4-dichlorobenzothiohydroxamic acid  mp 104°–105°C
4-nitrobenzothiohydroxamic acid  mp 111.5°–113.5°C
3-chlorobenzothiohydroxamic acid
Naphthathiohydroxamic acid
2,4-dimethylbenzothiohydroxamic acid
2-methyl-4-chlorobenzothiohydroxamic acid The post-emergent phytotoxic activity of various methods of this invention is demonstrated as follows. The active ingredients are applied in spray form to 14-day, or 21-day old specimens of the plant species listed. The spray, an aqueous-organic solvent containing active ingredient, is applied to the plants in different sets of pans at several rates of active ingredient per acre. The treated plants are placed in a greenhouse and the effects are observed and recorded after approximately 14 days or approximately 28 days, as is indicated in Table I.

The post-emergent phytotoxic acitivity index used in Table I is measured by the average percent control of each plant species and is defined as follows:

| Phytotoxicity | Numerical Scale |
|---|---|
| None | 0 |
| Slight | 1 |
| Moderate | 2 |
| Severe | 3 |
| Dead (kill) | 4 |

The following list of plants are those listed in Table I under the given letters:

A — Canada Thistle    M — Crab Grass

B — Nutsedge
C — Morning Glory
D — Wild Oats
E — Brome Grass
F — Rye Grass
G — Radish
H — Sugar Beets
I — Quackgrass
J — Johnson Grass
K — Foxtail
L — Barnyard Grass
N — Pigweed
O — Soybean
P — Wild Buckwheat
Q — Tomato
R — Sorghum
S — Rice
T — Smartweed
U — Cocklebur
V — Lambsquarter
W — Hemp sesbania
X — Wheat
Y — Velvet Leaf are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts by weight of active ingredient, from about 0.25 to 25 parts

TABLE I

| Compound | Conc. | A | B | C | D | E | F | G | H | I | J | K | L | M | N | O | P | Q | R | S | T | U | V | W | X | Y |
|---|---|---|---|---|---|---|---|---|---|---|---|---|---|---|---|---|---|---|---|---|---|---|---|---|---|---|
| I | .5 | 1 | 0 | 2 | | 0 | | | 2 | 0 | | 0 | | | | | | | | | 4 | 2 | 4 | | | 1 |
|  | .5 | | | 2 | 0 | 0 | 0 | 1 | 3 | | | 0 | | | 0 | | | 0 | 1 | 2 | 0 | | | | | |
|  | .2 | | 1 | | 0 | | 1 | | | | 0 | 2 | | 1 | 0 | | | 0 | 1 | | 3 | 2 | 0 | | | 0 |
| II | .5 | 0 | 0 | 3 | | 1 | | | 1 | 2 | | 1 | | | | | | | | | 2 | 2 | 4 | | | 2 |
|  | .5 | | 0 | 0 | 0 | 0 | 1 | 1 | | 0 | | 1 | 3 | 1 | 1 | 1 | 0 | | | 0 | 0 | 1 | 0 | 2 | 0 | |
|  | .2 | | 1 | | 0 | | 1 | | | | 0 | 0 | | 1 | 0 | | | 0 | 0 | 1 | 0 | 2 | 0 | | | 1 |
| III | .5 | 0 | 0 | 0 | | 0 | | | 0 | 0 | | 0 | | | | | | | | | 1 | | 2 | | | 0 |
|  | .5 | | 4 | 1 | 2 | 0 | 3 | 4 | | | | 4 | 4 | 2 | 4 | 4 | 1 | | | | | | | | | |
|  | .2 | | 1 | 1 | | | 3 | | | | 1 | 2 | 4 | 1 | | | | 1 | 0 | 2 | 4 | 4 | 1 | 2 | | |

I = 4-nitrobenzothiohydroxamic acid.
II = 3,4-dichlorobenzothiohydroxamic acid.
III = Benzothiohydroxamic acid.

NOTE.—0.5 is equivalent to between 9 and 10 pounds per acre and 0.2 is about 4 pounds per acre.

As mentioned hereinbefore the phytotoxic compositions of this invention comprise an active ingredient and one or more adjuvants which can be solid or liquid extenders, carriers, diluents, conditioning agents and the like. Preferred phytotoxicant compositions of this invention have been developed so that the active ingredients can be used to the greatest advantage to modify the growth of plants. The preferred compositions comprise wettable powders, aqueous suspensions, dust formulations, granules, emulsifiable oils and solutions in solvents. In general, these preferred compositions can all contain one or more surface-active agents.

Surface-active agents which can be used in the phytotoxic compositions of this invention are set out, for example, in Searle U.S. Pat. No. 2,426,417, Todd U.S. Pat. No. 2,655,447, Jones U.S. Pat. No. 2,412,510 and Lenher U.S. Pat. No. 2,139,276. A detailed list of such agents is also set forth by J. W. McCutcheon in "Soap and Chemical Specialties," November 1947, page 811 et seq., entitled "Synthetic Detergents;" "Detergents and Emulsifiers - Up to Date" (1960), by J. W. McCutcheon, Inc., and Bulletin E-607 of the Bureau of Entomology and Plant Quarantine of the U.S.D.A. In general, less than 50 parts by weight of the surface active agent is present per 100 parts by weight of plant growth regulant composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants by weight of wetting agent, from about 0.25 to 25 parts by weight of dispersant and from 4.5 to about 94.5 parts by weight of inert solid extender, all parts being by weight of the total composition. Where required from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for plant growth regulant dusts include micaceous talcs, pyrophyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the phytotoxic granules.

The mineral particles which are used in the granular phytotoxic compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular composition. The term "mesh" as used herein means U.S. Sieve Series.

The granular phytotoxic compositions of this invention generally contain from about 5 parts to about 30 parts by weight of active ingredient per 100 parts by weight of clay and 0 to about 5 parts by weight of surface active agent per 100 parts by weight of particulate clay. The preferred plant growth regulant granular compositions contain from about 10 parts to about 25 parts by weight of active ingredient per 100 parts by weight of clay.

The phytotoxic compositions of this invention can also contain other additaments, for example, fertilizers, other phytotoxicants, plant growth regulants, pesticides and the like used as adjuvant or in combination with any of the above-described adjuvants. Chemicals useful in combination with the active ingredients of this invention include for example, triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-s-triazine
2-chloro-4-ethylamino-6-isopropylamino-s-triazine
2-chloro-N,N-diallylacetamide
2-chloroallyl diethyldithiocarbamate
N'-(4-chlorophenoxy) phenyl-N,N-dimethylurea
isopropyl M-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
6,7-dihydrodipyrido(1,2-a:2',1'-c)-pyrazidiinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl-1-methylurea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4-nitrophenyl ether
alpha,alpha,alpha-trifluoro-2,6-dinitro-N,N-dipropyl-p-toluidine
S-propyl dipropylthiolcarbamate
2,4-dichlorophenoxyacetic acid
2',6'-diethyl-N-methoxymethyl-2-chloroacetanilide Fertilizers useful in combination with the active ingredients include, for example, ammonium nitrate, urea, potash, and superphosphate. Other useful additaments include materials in which plant organisms take root and grow such as compost, manure, humus, sand and the like.

When operating in accordance with the present invention, effective amounts of the active ingredient are applied to aboveground portions of plants. The application of liquid and particulate solid phytotoxic compositions to above-ground portions of plants can be carried out by conventional methods, e.g. power dusters, boom and hand sprayers and spray dusters. The compositions can also be applied from airplanes as a dust or a spray because of their effectiveness at low dosages.

The application of an effective amount of the active ingredient of the compositions of this invention to the plant is essential and critical for the practice of one embodiment of the present invention. The exact amount of active ingredient to be employed is dependent upon the response desired in the plant as well as such other factors as the plant species and stage of development thereof, the specific soil and the amount of rainfall as well as the specific active ingredient employed. In foliar treatment for the modification of vegetative growth, the active ingredients are applied in amounts from about 1 to about 50 or more pounds per acre. It is believed that one skilled in the art can readily determine from the teachings of this specification, including examples, the approximate application rate for best results.

Although the invention is described with respect to specific modifications, the details thereof are not to be construed as limitations except to the extent indicated in the following claims.

What is claimed is:

1. A herbicidal method comprising contacting plants with a herbicidally effective amount of a thiohydroxamic acid selected from the class consisting of 4-nitrobenzothio-hydroxamic acid, 3,4-dichlorobenzothiohydroxamic acid and benzothiohydroxamic acid.

2. The method of claim 1 wherein the thiohydroxamic acid is 4-nitrobenzothiohydroxamic acid.

3. The method of claim 1 wherein the thiohydroxamic acid is 3,4-dichlorobenzothiohydroxamic acid.

4. The method of claim 1 wherein the thiohydroxamic acid is benzothiohydroxamic acid.

* * * * *